Jan. 19, 1937. G. W. HAGLE 2,068,291
CEMETERY GROUND VASE, FLUSH TYPE
Filed June 30, 1936
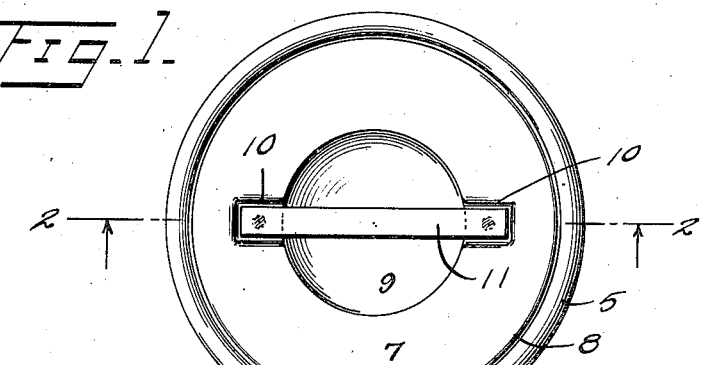
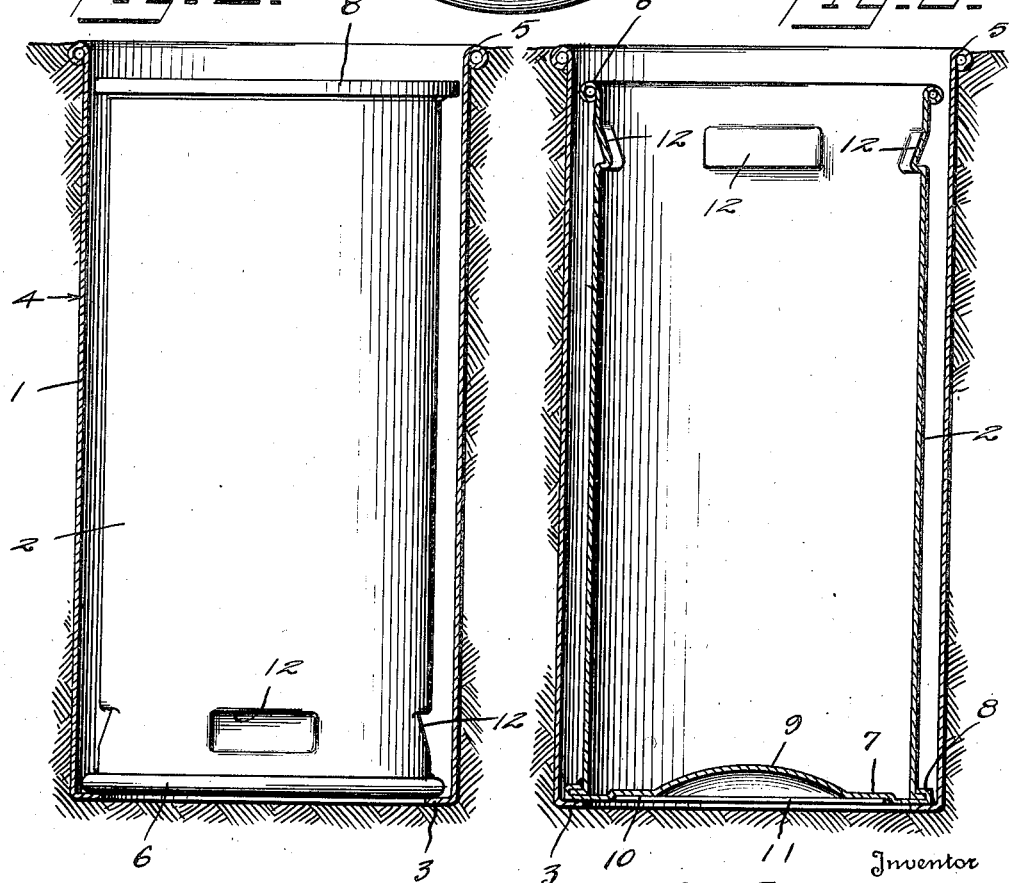
Inventor
G. W. Hagle
By Watson E. Coleman
Attorney Patented Jan. 19, 1937

2,068,291

UNITED STATES PATENT OFFICE 2,068,291

CEMETERY GROUND VASE, FLUSH TYPE

George W. Hagle, Hillsboro, Oreg.

Application June 30, 1936, Serial No. 88,252

2 Claims. (Cl. 47—41)

This invention relates to the class of receptacles and pertains particularly to a novel flower receptacle designed for use in cemeteries.

The primary object of the present invention is to provide a ground vase for use in cemeteries, which comprises two telescopically associated portions, the inner one of which portions is adapted to assume operative and inoperative positions and when in its inoperative position, is so arranged relative to the surface of the ground that it will not receive debris, rain water or other material, and will not be damaged by machines or pedestrians passing thereover.

Another object is to provide a cemetery ground vase which comprises an invertible inner portion which, when in upright position, is adapted to receive flowers and water, and when in inverted position, has its bottom arranged adjacent the surface of the ground so that the interior of the vase will be protected when not in use.

Another object is to provide a cemetery ground vase which is designed to be located entirely below the surface of the ground when in use, so that the cooling effect of the surrounding earth will be obtained to prevent the too rapid evaporation of moisture from the receptacle and to assist in longer preserving the flowers disposed therein.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in top plan of the invention showing the receptacle in inoperative position;

Figure 2 is a sectional view on the line 2—2 of Figure 1;

Figure 3 is a sectional view similar to Figure 2, but showing the vase in operative position.

Referring now more particularly to the drawing, the numeral 1 designates an outer cylinder which constitutes a housing or shield for the vase, which is indicated generally by the numeral 2. The cylinder 1 is formed of any suitable material, such as galvanized iron or it may be formed of a non-rusting material, if desired, and the bottom end thereof has the inturned flange 3 which rests upon the bottom of the hole 4 which is formed in the earth to receive the cylinder. At its top edge, the cylinder 1 is provided with a heavy protecting bead 5 which is illustrated as being formed by rolling back the material of the cylinder, but which obviously may be formed in any one of a number of different ways.

Freely received in the ground cylinder 1 is the cylindrical vase 2. This is also preferably formed of suitable sheet metal, but may be formed of any other suitable material and, as shown, it is provided at its open end with the reinforcing flange 6, while its opposite end is closed by the solid head 7 which is here shown as being secured to the edge of the vase body by means of the interlocking flange 8. The connection 8 may be made water-proof in any suitable manner as by welding or by soldering, and since the bottom 7 is imperforate throughout, it will be apparent that no leakages can occur and the effects of rust upon the receptacle will be greatly minimized.

In order to facilitate the grasping of the vase when the same is in the inoperative inverted position in which it is illustrated in Figures 1 and 2, the bottom 7 is pressed inwardly, as indicated at 9, and has at each side of the impressed portion, the slightly depressed areas 10, and extending across the portion 9 with its ends in the areas 10, is a bar 11 which is welded to the bottom 7, as illustrated in Figure 1.

Adjacent the open end, the wall of the face 2 has a series of inwardly pressed areas which form finger holds 12 whereby the vase may be lifted from the surrounding ground receptacle or cylinder 1 or may be conveniently lowered thereinto.

From the foregoing, it will be readily apparent that a ground vase constructed in accordance with the present invention has many desirable features over the types which are placed upon the surface of the ground in that the contents of the receptacle are kept cool by the surrounding earth and, therefore, the water in the receptacle will have its evaporation retarded and the flowers will last longer than if the receptacle were upon the top of the ground. Also, when the receptacle or vase is not in use, it can be turned with its open top directed downwardly, as shown in Figure 2, and thus the interior will be protected and prevented from collecting dirt or trash and will not fill up with rain water. At the same time, it will be kept conveniently in place and will not be damaged by the passage of grass cutting or other machines thereover or by the feet of pedestrians.

What is claimed is:—

1. A cemetery vase, comprising a shielding cylinder adapted to be sunk to the full extent of its length into the earth and a vase of the same cross-sectional contour as the cylinder and having a wall closing one end and having the other end open, said vase being of an overall length less than the length of the ground cylinder, finger hold means adjacent the open end of the vase, said wall closing the end of the vase having a central inwardly pressed area forming a finger recess, and a bar secured across said recess and forming a handle.

2. A cemetery vase comprising a shielding cylinder adapted to be sunk to the full extent of its length into the earth, and a vase of the same cross-sectional contour as the cylinder and having a wall closing one end and having the other end open, said shielding cylinder having its lower end provided with an inturned flange upon which said vase is supported, means at the closed end of said vase facilitating its removal from the cylinder when the vase is inverted therein, and means adjacent the open end edge of the vase facilitating its removal from the cylinder when the vase is in upright position therein, said last means comprising lugs forming inpressed portions of the wall material of the vase.

GEORGE W. HAGLE.